(12) United States Patent
Kottapalli et al.

(10) Patent No.: US 11,632,338 B2
(45) Date of Patent: Apr. 18, 2023

(54) MULTI-TENANT RESOURCE MANAGEMENT IN A GATEWAY

(71) Applicant: VMWARE, INC., Palo Alto, CA (US)

(72) Inventors: Ravi Kumar Reddy Kottapalli, Bangalore (IN); Srinivas Sampatkumar Hemige, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 6 days.

(21) Appl. No.: 16/547,633

(22) Filed: Aug. 22, 2019

(65) Prior Publication Data
US 2021/0044539 A1     Feb. 11, 2021

(30) Foreign Application Priority Data
Jul. 3, 2019   (IN) .............................. 201941026668

(51) Int. Cl.
| | | |
|---|---|---|
| H04L 47/762 | (2022.01) | |
| H04L 47/70 | (2022.01) | |
| H04L 9/40 | (2022.01) | |
| H04L 41/0896 | (2022.01) | |
| H04L 43/0876 | (2022.01) | |
| H04L 43/16 | (2022.01) | |

(52) U.S. Cl.
CPC ........ *H04L 47/762* (2013.01); *H04L 41/0896* (2013.01); *H04L 43/0876* (2013.01); *H04L 43/16* (2013.01); *H04L 47/822* (2013.01); *H04L 47/823* (2013.01); *H04L 63/02* (2013.01); *H04L 63/10* (2013.01)

(58) Field of Classification Search
CPC ............. H04L 67/1002; H04L 67/1023; H04L 41/0896; H04L 43/0876; H04L 43/16; H04W 16/14; H04W 88/16
See application file for complete search history.

(56) References Cited

U.S. PATENT DOCUMENTS

| | | | |
|---|---|---|---|
| 8,082,550 B2 * | 12/2011 | O'Toole, Jr. ......... | G06Q 20/102 718/104 |
| 2005/0177635 A1 * | 8/2005 | Schmidt ..................... | G06F 9/52 709/226 |
| 2016/0113041 A1 * | 4/2016 | Smith ............... | H04W 72/0493 455/404.1 |
| 2018/0199384 A1 * | 7/2018 | Mizikovsky .......... | H04W 76/38 |
| 2019/0238438 A1 * | 8/2019 | Hassan ............... | H04L 41/5003 |
| 2019/0273953 A1 * | 9/2019 | Hasek ................ | H04N 21/2396 |

\* cited by examiner

*Primary Examiner* — Raj Jain (57) ABSTRACT

Described herein are systems, methods, and software to manage resources in a gateway shared by multiple tenants. In one example, a system may monitor usage of resources by a tenant of the gateway and compare the usage with usage limits associated with the resources. The system may further determine when the usage of a resource exceeds a usage limit associated with the resource and, when the usage of the resource exceeds the usage limit, identify an operation associated with causing the usage limit to be exceeded and blocking the operation.

20 Claims, 7 Drawing Sheets

MULTI-TENANT RESOURCE MANAGEMENT IN A GATEWAY

RELATED APPLICATIONS

Benefit is claimed under 35 U.S.C. 119(a)-(d) to Foreign Application Serial No. 201941026668 filed in India entitled "MULTI-TENANT RESOURCE MANAGEMENT IN A GATEWAY", on Jul. 3, 2019, by VMWARE, INC., which is herein incorporated in its entirety by reference for all purposes.

TECHNICAL BACKGROUND

In computing environments, software defined networks may be used that comprise software modules capable of providing a communication platform for one or more computing nodes, such as virtual machines and containers, in the computing environment. The software defined networks, which may include logical switches, routers, distributed firewalls, and the like, may be used to intelligently direct communication on the network by inspecting packets before passing them to other computing nodes. For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

In some implementations, computing environments, such as those employed for organizations, may employ edge gateways or gateways that can be used as a virtual router to communicate packets between the organization's various computing sites and other external network devices. These edge gateways may provide network services such as static routing, virtual private networking, load balancing, firewall operations, Dynamic Host Configuration Protocol (DHCP), network address translation (NAT), or Internet Protocol Security (IPSec) communications. However, as an increased number of physical or virtual computing elements are coupled to the edge gateway, resources, such as processing resources and memory resources, of the edge gateway can become difficult to manage in relation to limits of the edge gateway. An example implementation of identifying resource limits is described in U.S. patent application Ser. No. 16/276,647 to Kumar et al., which is incorporated herein by reference. These difficulties are compounded when an edge gateway supports computing elements associated with multiple tenants.

SUMMARY

The technology described herein manages resource allotment in a gateway shared by multiple tenants. In one implementation, a gateway monitors resource usage in the gateway by a tenant associated with the gateway and compares the usage of the resources with usage limits associated with the resources. In comparing the usage with the limits, the gateway may determine when the usage of a resource exceeds a usage limit and, when the usage of the resource exceeds the usage limit, identify an operation associated with causing the limit to be exceeded and blocking the operation.

DETAILED DESCRIPTION

Figure 1:
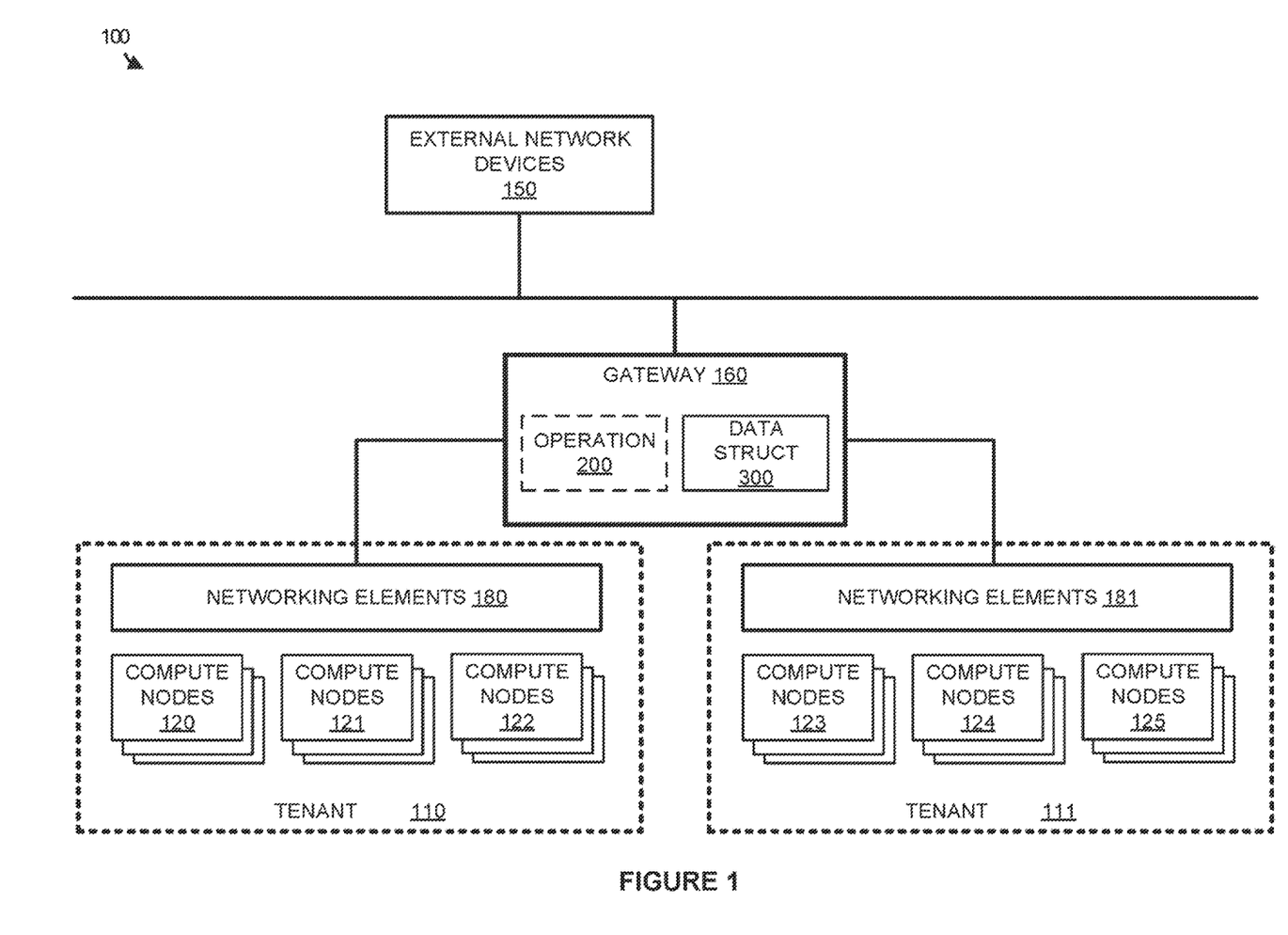
FIG. 1 illustrates a computing environment to manage resources in a shared gateway according to an implementation.

FIG. 1 illustrates a computing environment 100 to manage resources in a shared gateway according to an implementation. Computing environment 100 includes gateway 160, networking elements 180-181, computing nodes 120-125, and external network devices 150. Networking elements 180 and computing nodes 120-122 correspond to tenant 110, while network elements 181 and computing nodes 123-125 correspond to tenant 111. Although demonstrated with two tenants in the example of computing environment 100, gateway 160 may support additional tenants in some examples. Gateway 160 provides at least operation 200 that is further described in FIG. 2 and maintains data structure 300 that is further described in FIG. 3

Figure 3:
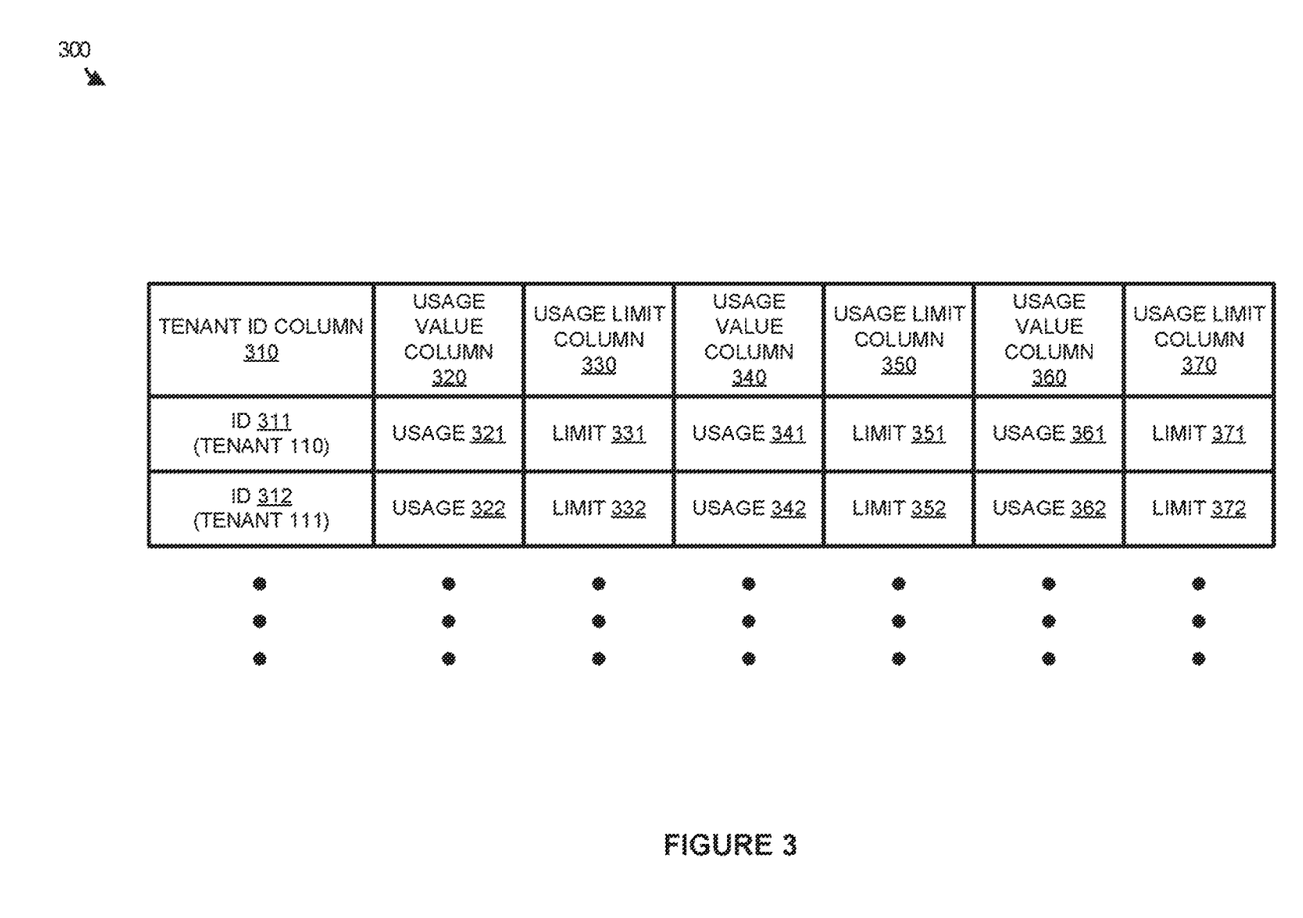
FIG. 3 illustrates a data structure to manage resource usage limits for tenants of a gateway according to an implementation.

In operation, gateway 160 is deployed in computing environment 100 to act as a virtual router for tenants 110-111. Gateway 160 may provide network services such as static routing, virtual private networking, load balancing, firewall operations, Dynamic Host Configuration Protocol (DHCP), network address translation (NAT), Internet Protocol Security (IPSec) communications, or some other routing operation. In the present implementation, gateway 160 may provide different qualities of service to the network elements and computing nodes of tenants 110-111. For example, tenant 110 may be associated with a first quality of service or service level agreement that comprises first resource limits, while tenant 111 may correspond to a second quality of service comprising second resource limits. The resource limits may be maintained within data structure 300, wherein the resource limits may define firewall session limits, network address translation entry limits, routing table entry limits, IPSec session limits, processing resource limits (percentage or ratio of processing resources), or some other resource limit for gateway 160.

In connecting gateway 160 to each tenant of tenants 110-111, tenants 110-111 each include corresponding networking elements 180-181, wherein networking elements 180-181 may comprise virtual (or physical) gateways, routers, switches, or other similar computing elements capable of providing networking interactions between computing nodes 120-125 and gateway 160. Computing nodes 120-125 may comprise virtual computing nodes, such as virtual machines or containers, and may comprise physical computing systems in some examples. In some implementations, networking elements 180-181 may each include a gateway that provides similar operations to that of gateway 160, where gateway 160 may provide the connection to external network devices 150 while maintaining the qualities of service required by tenants 110-111. External network devices 150 may comprise physical computing systems, such as laptops, desktops, tablets, smartphones, and the like, and may further comprise virtual machines, containers, or some other virtualized endpoint.

Figure 2:
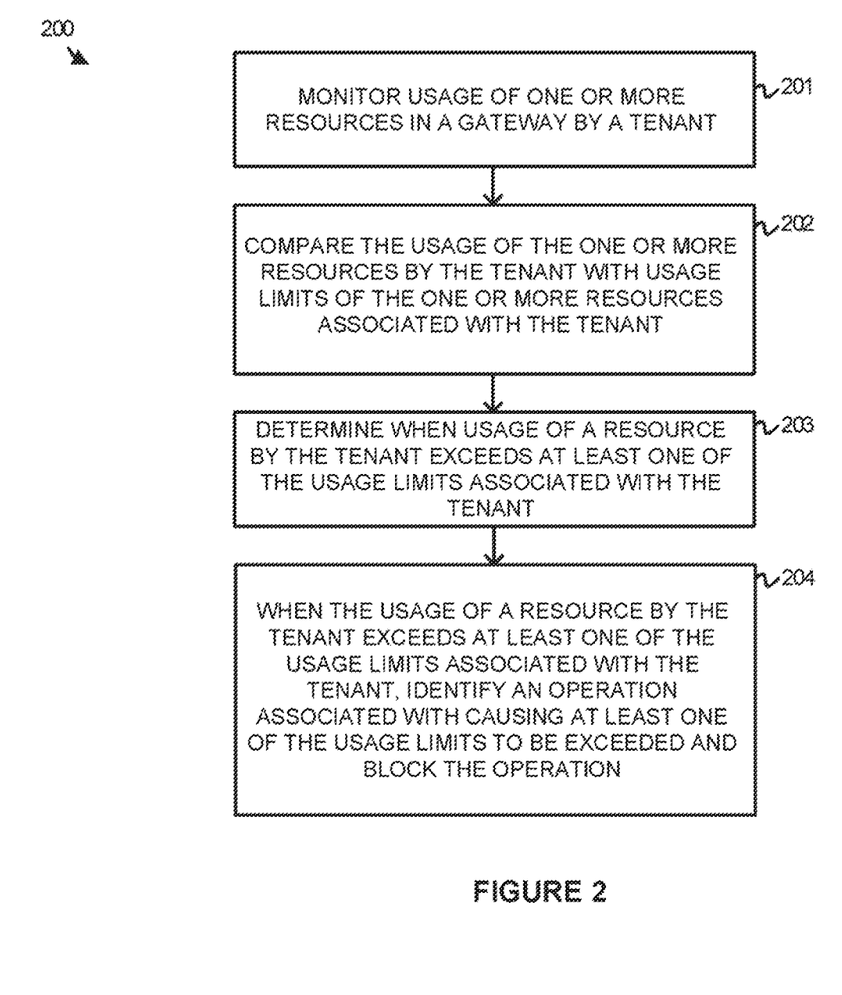
FIG. 2 illustrates an operation of a gateway to manage resource allocation to tenants according to an implementation.

FIG. 2 illustrates an operation 200 of a gateway to manage resource allocation to tenants according to an implementation. The processes of operation 200 are referenced parenthetically in the paragraphs that follow with reference to systems and elements of computing environment 100 of FIG. 1.

As depicted, operation 200 includes monitoring (201) usage of one or more resources in a gateway 160 by a tenant of a plurality of tenants associated with the gateway. As described herein, gateway 160 may be configured to provide various networking operations for computing nodes coupled to the network(s) supported by the gateway. In some implementations, a single gateway may provide networking operations for multiple tenants, wherein the tenants may comprise organizations, subdivisions of an organization, a user, or some other group or user. For example, gateway 160 may operate in a data center that provides a computing platform for computing nodes of multiple organizations. Each of the tenants may be associated with a quality of service to. The quality of service or service level agreement may define usage limits of gateway 160 by the corresponding tenant, wherein the usage limits may comprise firewall session limits, network address translation entry limits, routing table entry limits, IPSec limits, processing resource limits, or some other resource limit for gateway 160. In at least one implementation, when a tenant is added to the computing environment, an administrator associated with the tenant may define a quality of service required by the tenant. Based on the selection, data structure 300 may be updated to reflect the selection and gateway 160 may monitor the resource usage by nodes and networking devices of the tenant when they use gateway 160.

While monitoring the resource usage of the tenant, operation 200 further compares (202) the usage of the one or more resources with one or more usage limits associated with the one or more resources, and determines (203) when the usage of a resource in the one or more resources exceeds at least one usage limit of the one or more usage limits. As described previously, when a tenant joins the computing environment, the tenant may be allocated a quality of service that corresponds to the gateway resources that are available to the tenant. As a result, when computing nodes associated with the tenant are added to the computing environment and configured to communicate using gateway 160, gateway 160 may identify the communications that correspond to the tenant and determine whether the communications are permitted.

In some implementations, when a request is generated for a communication operation, such as a request to create an IPSec session, the request may be applied to the current usage for the tenant and the current usage may be compared to usage limits for the tenant. If the resource usage is not exceeded, then the communication operation request may be permitted. However, if it is determined that the usage by the tenant exceeds the limit, then gateway 160 may identify (204) the operation that caused or is associated with causing the limit to be exceeded and may block the corresponding operation. Operations that may cause limits to be exceeded may include requests for IPSec sessions, requests for firewall sessions, network address translation update requests, or some other similar request.

In some examples, gateway 160 may determine whether the request should be permitted prior to implementing or forwarding packets associated with the request. For example, when a communication is generated from a computing node associated with the tenant, gateway 160 may determine how the request would change resource usage by the tenant and determine whether the changed resource usage would exceed the limits defined for the tenant. If the usage would not be exceeded, then the request may be permitted, and the corresponding action may be implemented. If the usage would exceed the limits, then the operation requested may be blocked by gateway 160. In other examples, rather than determining whether to block an operation prior to the implementation of the operation, gateway 160 may implement the operation and update data structure 300 based on the implemented operation. Once updated, gateway 160 may determine whether the update to data structure 300 caused a usage limit to be exceeded. If a usage limit is exceeded, gateway 160 may identify an operation associated with causing the limit to be exceeded and block or stop the corresponding operation.

In some implementations, in addition to monitoring resource usage and blocking operations associated with the resource usage, gateway 160 may further determine trends associated with the resource usage by each of the tenants. The trends may be used to automatically modify or suggest modifications to the resource limits based on trends on the resource usage by a particular tenant. In one example, the trends for a particular tenant may be based on the frequency that resource usage exceeds a resource limit, the average resource usage over a period of time, or some other resource usage statistic. From the trends, gateway 160 may determine one or more modifications to the resource limits based on the trends. For instance, a trend may indicate that a tenant frequently initiates operations that exceed the processing resource limit for the tenant, wherein the processing resources may be measured using a percentage or ratio of the overall processing resources available. As a result, a modification may be identified that can raise the processing resource limit for the tenant. In raising the processing resource limit, the tenant may be moved from a first quality of service to a second quality of service, wherein the second quality of service may incur a larger cost (monetary) on the tenant.

In some implementations, the modification to the resource limit may be implemented automatically. In other implementations, the limit modifications may be provided as suggestions to an administrator associated with the tenant. From the suggestions, the administrator may select or approve one or more of the limit modifications, and gateway 160 may update the limits based on the selection. The limits may be modified for various sized periods of time based on the resource usage trends; however, it should be understood that limits may be modified for an indefinite period of time in some examples. As an example, gateway 160 may determine that a usage limit is frequently exceeded during a three hour period. Consequently, the modification to the resource limit may only increase the resource limit for the three hour period.

Although demonstrated in the previous examples as increasing the resource limits for a tenant, similar operations may be performed to decrease the limits for the tenant. For example, when a tenant is using resources that infrequently exceed limits associated with the resources, gateway 160 may determine that one or more resource limits can be reduced for the tenant. This reduction in resource limits may be associated with a lower quality of service in some examples, wherein the lower quality of service may be associated with a different monetary cost for the tenant in using gateway 160. Thus, gateway 160 may dynamically modify resource limits to efficiently provide the required resources to the tenants associated with the gateway.

In some implementations, rather than allocating limits individually to the tenants of the gateway, resource limits may correspond to the entire gateway. In particular, resource limits, such as IPSec session limits, processing resource usage limits, firewall session limits, and the like may be implemented across all tenants. As a result, each of the tenants may request and receive resources, so long as the limit has not been reached for the gateway. Once the limit is reached, operations for each of the tenants may be stopped or blocked based on a quality of service allocated to each of the tenants. In some implementations, the quality of service may be defined as ratios, where a first tenant's resources are defined in relation to the other tenants of the gateway. For example, a first tenant may be allocated a quality of service that entitles the first tenant to five times the number of IPSec sessions of the other tenants of the gateway. Thus, when the IPSec limit is met for the gateway, the gateway may block or stop operations associated with each tenant to maintain the ratio of IPSec sessions for each of the tenants. In other examples, rather than providing a ratio defining the resources available to the tenants, each of the tenants may be allocated a minimum quantity of resources. Returning to the IPSec example, when the gateway limit is attained, the gateway may block or stop IPSec operations associated with tenants in accordance with the minimum quantity of resources for each of the tenants. In some examples, when selecting the tenant operation to be blocked, the gateway may select an operation randomly from a tenant that has exceeded its minimum resources, may select an operation from the tenant with the highest amount of resources used over the minimum amount of resources, or may select an operation based on any other factor.

In some examples, the resource limits associated with the gateway may be allocated by an administrator of the gateway, wherein the administrator may define the resource limits for each of the tenants or the overall usage limits associated with the gateway. In other examples, at least a portion of the limits may be defined based on configuration limitations associated with the gateway. These configuration limitations may comprise memory limitations, processing resource limitations, or some other limitations. In deploying the gateway, the physical limitations may be tested to determine at least a portion of the resource limits associated with the gateway. For example, a stress test may identify the quantity of IPSec sessions, firewall sessions, or other resources that the gateway can support. These limitations may then be used to determine when operations should be blocked from each of the tenants.

FIG. 3 illustrates a data structure 300 to manage resource usage limits for tenants of a gateway according to an implementation. Data structure 300 is an example of a data structure that can be deployed and interacted with by gateway 160, although other examples may exist. Data structure 300 includes tenant identifier column 310, usage volume columns 320, 340, and 360, and usage limit columns 330, 350, and 370. Tenant identifier column 310 includes identifiers 311-312 that correspond to tenants 110-111, respectively. Usage value columns 320, 340, and 360 include usages 321-322, 341-342, and 361-362. Usage limit columns 330, 350, and 370 includes limits 331-332, 351-352, and 371-372. Although demonstrated as a table in the example of FIG. 3, it should be understood that a gateway may maintain one or more arrays, trees, linked lists, tables, or some other data structures to manage the usage information and usage limits for tenants of a gateway.

As described herein, a gateway may act a virtual router between a first set of computing nodes and other computing nodes over a network. The first set of computing nodes may comprise containers, virtual machines, or physical computing systems that can correspond to a plurality of tenants that may each require a private network, unique firewall configurations, or some other similar configuration element. To support the individual requirements for the corresponding tenants, the gateway may maintain data structure 300 to ensure that each tenant is provided a quality of service associated with the tenant. In particular, when a tenant joins a network, the tenant may be allocated resources for gateway 160, wherein the resources may be associated with limits. Such limits may include a quantity of firewall sessions, IPSec sessions, processing resource usage, or some other limit for the tenant with respect to gateway 160.

As an example, tenant 110 is allocated identifier 311, which includes usage limits 331, 351, and 371. Each limit of limits 331, 351, and 371 corresponds to a usage of usages 321, 341, and 361, wherein the usages may be monitored by the gateway based on communication session requests, configuration modifications, and other operations related to gateway 160. For example, when an IPSec communication is requested by a tenant, gateway 160 may update the usage associated with IPSec communications and determine whether the added session exceeds the limit associated with the IPSec sessions. If the new request does not exceed the session limit, then the request may proceed and an IPSec session may be implemented. However, if the new request does exceed the session limit, gateway 160 may identify the request or operation that caused the operation to exceed the limit and may block the corresponding operation.

In some examples, gateway 160 may determine whether an operation exceeds a limit prior to implementing the required operation. In other examples, the implementation of the operation may occur in parallel with the determination of whether the request exceeds the limit. As a result, if a limit is exceeded within data structure 300, gateway 160 may determine a corresponding action that caused the limit to be exceeded, and may drop the corresponding action or session. Referring again to the IPSec example, gateway 160 may initiate the IPSec session prior to determining whether the resources are available for the session. However, once it is determined that the tenant has exceeded the limit, then the action that caused the limit to be exceeded may be removed or stopped on gateway 160. Thus, if an IPSec session request caused a limit to be exceeded, gateway 160 may terminate the IPSec session. The operation that caused the limit to be exceeded may be determined by a log file, by an action buffer, or by some other mechanism.

In some implementations, an administrator or user associated with the tenant may define the individual limits that are associated with the tenant. Accordingly, referring to an example with tenant 110, an administrator may define each individual limit of limits 331, 351, and 371 that corresponds to the tenant. In other implementations, when a tenant is deployed, the tenant may be associated with a quality of service, wherein the quality of service may define the resource limits for the client. The quality of service may be allocated based on an administrator selecting the quality of service for the tenant, the types of computing nodes associated with the tenant, a service level agreement for the tenant, or some other factor.

In some examples, rather than allocating limits to each individual tenant, the resource usage of all the tenants may be compared to a limit for the gateway. The resource usage may comprise an overall IPSec limit, an over firewall session limit, a processing resource percentage limit, or some other resource limit. When a resource limit for the gateway is attained, the gateway may select at least one operation to be blocked. The operation that is blocked may comprise the most recently requested operation, an operation randomly selected by the gateway, or an operation based on qualities of service allocated to the individual tenants. As an example, a gateway may be allocated a maximum quantity of firewall sessions. When a new firewall session is requested by a tenant that would exceed the maximum quantity of firewall sessions, the gateway may determine a firewall session that should be blocked or stopped. In some examples, each of the tenants may be allocated a minimum quantity of firewall sessions (or other resources). As a result, when the firewall threshold is met, the gateway may select a tenant to have a firewall session operation blocked, such that each of the tenants maintains their corresponding minimum quantity of firewall sessions. In selecting the operation to be blocked, the gateway may select a random operation to be blocked, such that the minimum quantity of sessions are maintained, may select a tenant session based on the current quantity of sessions used by the tenant in relation to their minimum, or may select the operation to be blocked in any other manner.

In some examples, the quality of service associated with each of the tenants may define a ratio of resources that are available to each tenant in relation to the other tenants. For example, the ratio may define that a first tenant may receive five times as many IPSec sessions as the other tenants of the gateway. Thus, when the limit is met for the gateway, the gateway may select IPSec operations to be blocked based on maintaining the ratio of IPSec sessions between the first tenant and the other tenants.

In some implementations, the gateway may monitor the quantity of operations that are blocked for each of the tenants and may generate quality of service suggestions for administrators associated with each of the tenants. For example, if the operations of a tenant are frequently blocked or satisfy blocked criteria, the gateway may notify the administrator that the current quality of service is inadequate for the tenant. Similarly, if the tenant's resource usage satisfies criteria indicating that quality of service is too high for the tenant (i.e., the resource usage is frequently below the limit for the tenant), the gateway may generate a notification indicating a suggestion to lower the quality of service associated with tenant.

Figure 4A:
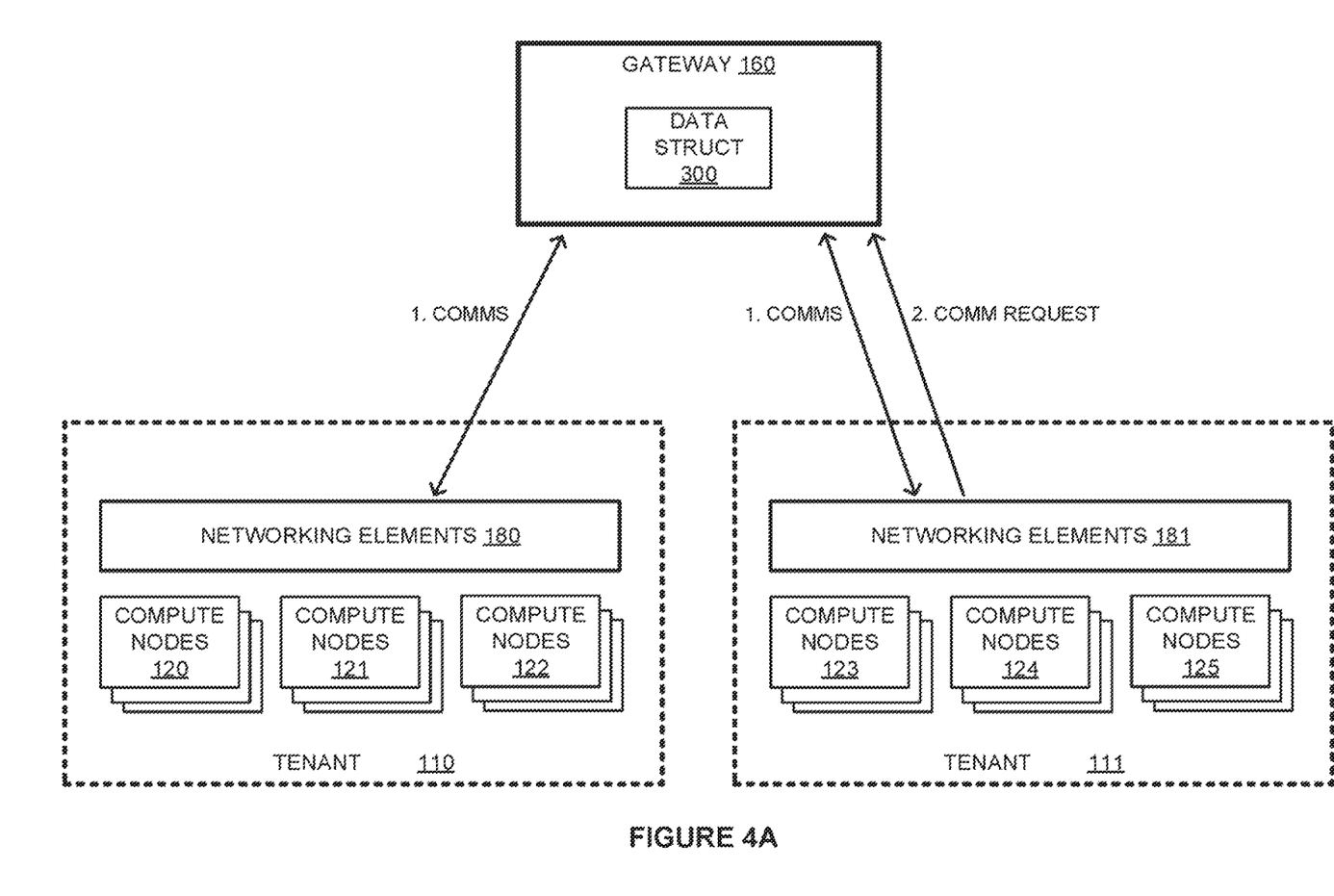
FIGS. 4A and 4B illustrates an operational scenario of blocking an operation from a tenant according to an implementation.
Figure 4B:
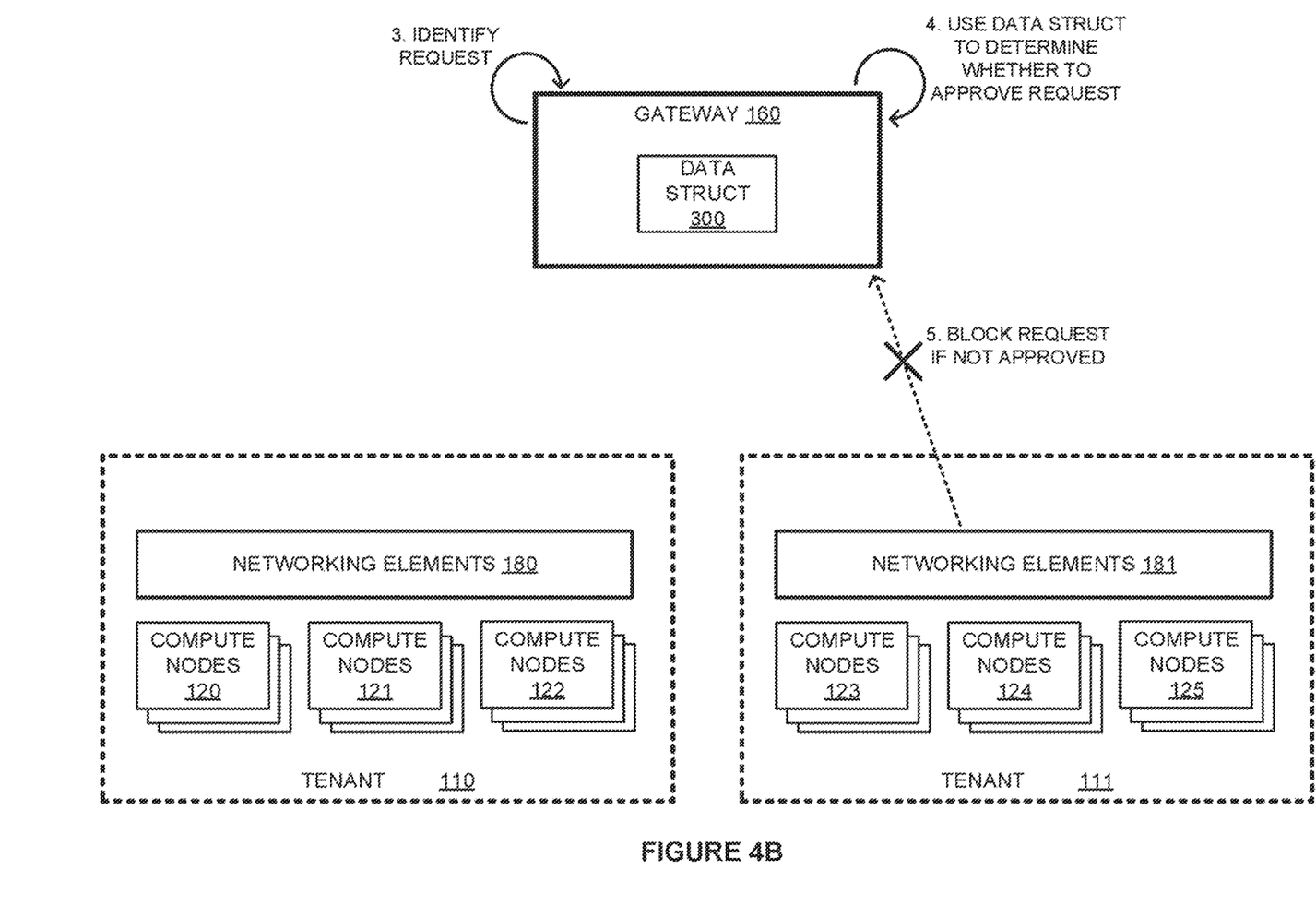

FIGS. 4A and 4B illustrates an operational scenario of blocking an operation from a tenant according to an implementation. FIGS. 4A and 4B include the systems and elements from computing environment 100 of FIG. 1.

Referring first to FIG. 4A, gateway 160 may act as a router for computing nodes 120-125 of the computing network. Gateway 160 provides operations for IPSec sessions, firewall sessions, NAT operations, routing table operations, or some other operations for the computing nodes of tenants 110-111. In some implementations, tenants 110-111 may each correspond to separate logical networks that can be implemented using encapsulation, private networks, network address translation, or some other function.

To ensure that each of the tenants are provided with the adequate service to support the networking operations, gateway 160 maintains data structure 300 that indicates usage limits for the tenants, wherein the limits may include communication sessions, processing resources, memory resources, firewall sessions, or some other limit.

Here, gateway 160 processes, at step 1, communication packets from networking elements 180-181 and forwards or blocks the communications based on rules associated with the tenants. While providing the communications, a communication request may be received, at step 2, from networking elements 181 and a compute node of computing nodes 123-125. For example, a computing node in computing nodes 123-125 may require an IPSec communication session with a computing element available over gateway 160.

Turning to FIG. 4B, when the communication is received, an operation within gateway 160 may identify, at step 3, that the communication request corresponds to a limit enforced using data structure 300. Once identified, gateway 160 may determine whether to approve the request based on data structure 300. In some implementations, prior to implementing the request, gateway 160 may update a corresponding usage within data structure 300 to determine, at step 4, whether the communication is permitted. Once updated and the usage remains below an associated limit, the communication may be permitted and gateway 160 may initiate the operations to corresponding to the communication request. In contrast, if after updating data structure 300, it is determined that the communication request would exceed the limit or threshold of available resources available for the tenant, the communication request may be dropped at step 5.

In some implementations, rather than determining whether a communication is permitted prior to implementing the corresponding request. Gateway 160 may work in parallel with the corresponding operation. For example, returning to the request for an IPSec session, gateway 160 may initiate the required operations to initiate the session, while another process may update and determine whether resources are available to support the request. If the resources are available, then gateway 160 may approve the operations and provide the processing to support the operations. However, if the request is not permitted, gateway 160 may block the request, wherein blocking the request may include terminating a communication session, a firewall session, or some other operation to block the corresponding request.

Although demonstrated in the previous example as dropping the most recent communication request, it should be understood that the blocked operation may comprise other operations (communications) associated with the resource usage. For example, referring to a request for an IPSec session, gateway 160 may block a IPSec session that is associated with computing elements with a lower quality of service, may block a IPSec session that has communicated the least number of packets, may block a IPSec session at random, or may block any other IPSec session based on configuration choices for gateway 160. Referring to the request identified from tenant 111, when it is determined that the tenant exceeds a limit associated IPSec communication sessions, gateway 160 may identify the operations or communication sessions that are associated with the IPSec communication resource usage, determine a quality of service requirement associated with each of the sessions, and select a session to be blocked or terminated based on the qualities of service allocated to the sessions. Advantageously, rather than preventing the most recent IPSec communication, gateway 160 may select one or more other IPSec communication sessions that can be blocked to reduce the resource usage by the tenant.

Figure 5:
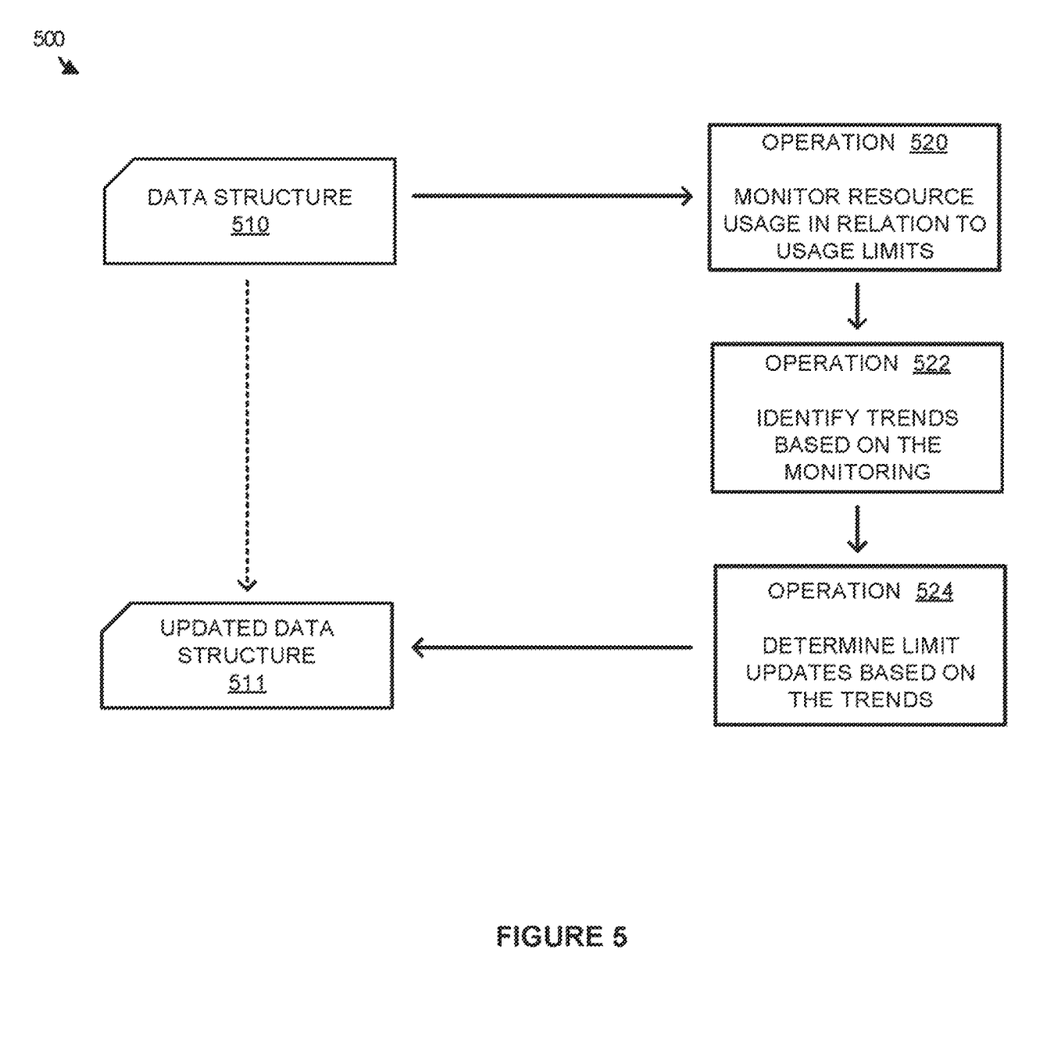
FIG. 5 illustrates an operational scenario of using a data structure to approve operations in a gateway according to an implementation.

FIG. 5 illustrates an operational scenario 500 of using a data structure to approve operations in a gateway according to an implementation. Operational scenario 500 includes data structure 510, updated data structure 511, and operations 520, 522, and 524. Although demonstrated with a single data structure in the example of operational scenario 500, it should be understood that any number of data structures may be used to maintain resource usage information and resource limit information for tenants associated with a gateway.

In operation, a gateway may monitor resource usage information for tenants using the gateway and compare the resource usage to limits associated with the individual tenant. In monitoring and comparing the resource usage, a gateway may maintain data structure 510 that includes resource usage statistics and corresponding limits for the statistics. For example, the gateway may monitor a quantity of routing table entries for each of the tenants associated with the gateway and compare the quantity with limits associated with each of the tenants. When a limit is exceeded, the gateway may identify an operation that is associated with causing the limit to be exceeded and may block or stop the operation. Thus, if a request was generated to add a new entry to the routing table, the gateway may block the entry from being added to the data structure. Operations associated with causing limits to be exceeded may include communication requests, IPSec session requests, NAT entry requests, or some other operation.

Here, the gateway may further perform operation 520 that monitors the resource usage in relation to the usage limits. In some implementations, the monitoring operation may include determining when a usage limit is exceeded, a ratio of resources consumed in relation to the resource limit, or some other attribute associated with resource usage by a tenant. As the resource usage is monitored, the gateway further performs operation 522 that identifies trends based on the monitoring. The trends may be identified based on the frequency that a usage limit was exceeded, based on the total quantity of instances that a limit was exceeded, or based on any other factor. For example, during a three hour period over multiple days, a tenant may exceed a limit of IPSec sessions available to the tenant. After identifying the trends, the gateway may perform operation 524 that determines limit updates based on the trends. Referring to the example of IPSec sessions that frequently exceed a usage limit during a three hour period, operation 524 may determine an update to the usage limit that permits increased IPSec sessions for all time periods, for the three hour time period, or for some other interval. Advantageously, rather than blocking IPSec session requests, updating the IPSec limit associated with the tenant may permit additional sessions to support the load of the tenant. Once the limit updates are identified, the gateway may implement the updates in data structure 510 to generate updated data structure 511.

In some implementations, the usage limits allocated to each of the tenants may correspond to a quality of service for the tenant. As a result, when a usage limit is increased for a tenant, the tenant may be moved to a higher or better quality of service that is associated with a higher cost for the tenant. In some implementations, the gateway may update the data structure without approval from an administrator associated with the tenant. For example, a tenant may approve a dynamic quality of service that can be modified based on the identified requirements from the gateway. This may permit first limits to be associated with a tenant when the resource requirements are low for the tenant, whereas second limits may be associated with the tenant when the resource requirements are high. In other implementations, the gateway may generate a notification that indicates usage limit suggestions for an administrator associated with the tenant, wherein the notification may further indicate usage attributes that triggered the suggested modification to the usage limit. Once the notification is generated and provided to the administrator, the administrator may select one or more of the updates to be implemented for the tenant and the gateway may update data structure 510 with the one or more updates to generate updated data structure 511.

Although demonstrated as increasing the usage limits for the tenants, it should be understood that similar operations may be applied to decrease the usage limits. For example, if trends are identified that indicate a tenant is not using a portion of the resources available to the tenant, the gateway may determine updates that are used to decrease the limits available to the tenant. As a result, the tenant may be moved to a lower quality of service, which can reduce the costs associated with using the gateway.

Figure 6:
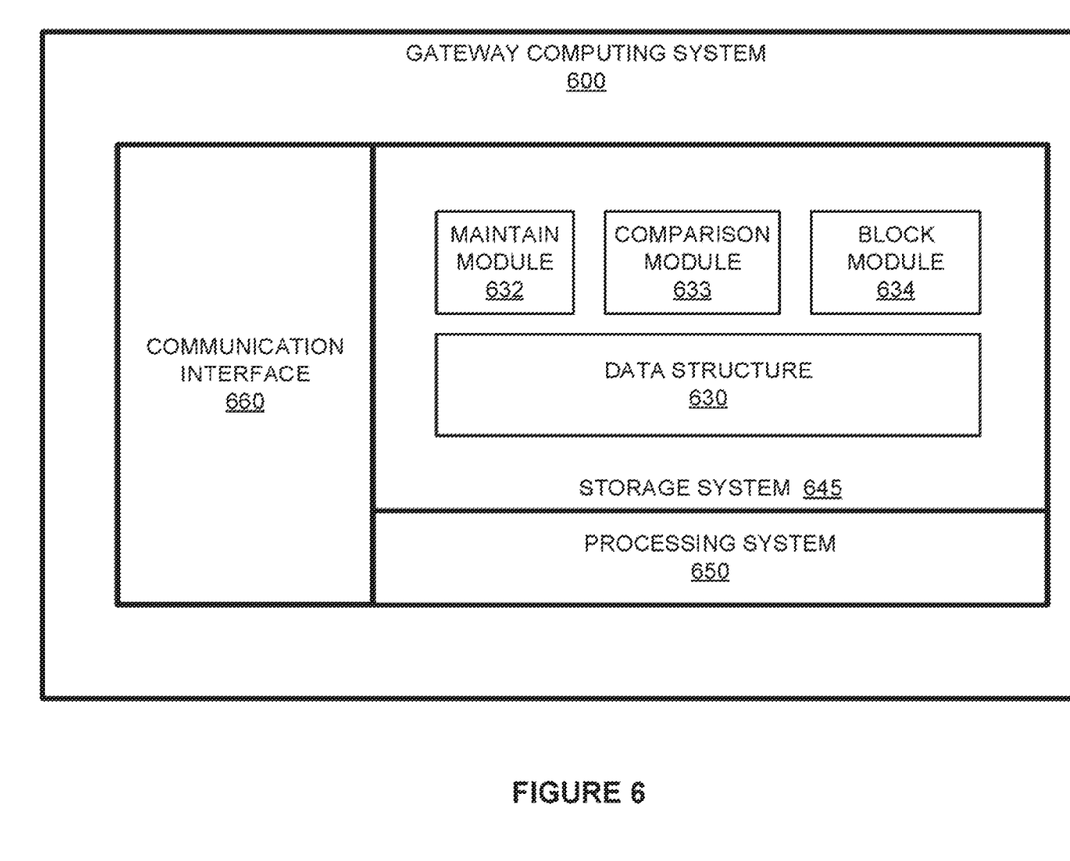
FIG. 6 illustrates a gateway computing system according to an implementation.

FIG. 6 illustrates a gateway computing system 600 according to an implementation. Computing system 600 is representative of any computing system or systems with which the various operational architectures, processes, scenarios, and sequences disclosed herein for an edge gateway can be implemented. Computing system 600 is an example of gateway 160, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is configured to communicate with one or more host computing systems that provide a platform for virtual computing nodes of a computing network. Communication interface 660 may further communicate with one or more computing devices that are external to the network supported by computing system 600.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises maintain module 632, comparison module 633, and block module 634, although any number of software modules may perform the operations described herein. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, maintain module 632 directs processing system 650 to monitor usage of one or more resources in a gateway by each tenant associated with the gateway. The tenants may comprise organizations, subdivisions of organizations, or some other tenant capable of communicating data using computing system 600. As the resource usage is monitored for the tenants, comparison module 633 directs processing system 650 to compare the resource usage to limits associated with each of the individual tenants. The resource usage and resource usage limits may correspond to IPSec sessions, firewall sessions, processing system or memory resource usage, or some other resource usage in association with computing system 600. In at least one implementation, one or more data structures may be maintained by computing system 600 that can be used to store information about the current resource usage for each of the tenants and further contain information for resource limits associated with each of the tenants.

As the resource usage is compared with the corresponding limits, block module 634 directs processing system 650 to determine whether an operation, such as a communication request or firewall session request, should be blocked on computing system 600 based on the comparison. In particular, when a resource usage is determined to exceed a corresponding limit for a tenant, block module 634 may determine an operation on the gateway should be blocked to reduce the resource usage for the corresponding tenant. Block module 634 may block a most recent operation that caused the limit to be exceeded, may block an operation associated with the limit being exceeded based on qualities of service associated with the various operations, may block an oldest operation, or may block an operation based on any other factor. As an example, when a communication request is obtained from a tenant to generate an IPSec session with another computing element over a network, computing system 600 may determine whether the new IPSec session would exceed a limit associated with the tenant and permit or deny the connection based on whether the session would exceed the limit. The determination of whether to permit an operation may occur prior to implementing the operation or may occur in parallel with implementing the operation. Using the IPSec example, prior to implementing the IPSec session, computing system 600 may consult data structure 630 to determine whether the additional session will exceed the limits associated with the tenant. In other examples, computing system 600 may initiate the required processes to establish the IPSec session in parallel with consulting data structure 630. Consequently, if the new IPSec session operation is not permitted based on data structure 630, the configuration operations may be canceled, and the session dropped for the tenant.

In some examples, computing system 600 may monitor the resource usage of the tenants to determine resource usage trends for the various tenants. In identifying the trends, computing system 600 may determine the frequency that a tenant exceeds one or more of the usage limits, the average resource usage by a tenant, time periods of increased usage by a tenant, or some other information related to trends in the resource usage of the tenants. In some examples, the trends may be used to adjust the quality of service that is allocated to a tenant. For example, the trends may identify a time period where a tenant's resource usage often exceeds one or more resource limits. As a result, computing system 600 may increase the resource limits available to the tenant during the time period. This allocation of additional resources may be associated with a better quality of service, a higher cost associated with the tenant, or some other change for the tenant. In some examples, rather than automatically implementing a change for the tenant, computing system 600 may generate a notification to be supplied to one or more administrators associated with the tenant. The notification may indicate information about the identified trends, suggested changes to the resource limits of the tenant, or some other information. From the notification, an administrator for the tenant may select a different quality of service or different usage limits for computing elements in the tenant network.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
monitoring usage of one or more resources of a gateway by a tenant of a plurality of tenants associated with the gateway, wherein the one or more resources comprise firewall sessions, network address translation entries, routing table entries, or internet protocol security (IPsec) sessions;
comparing the usage of the one or more resources with one or more usage limits associated with the one or more resources for the tenant;
determining when the usage of a resource in the one or more resources exceeds at least one usage limit of the one or more usage limits; and
when the usage of the resource exceeds the at least one usage limit:
identifying an operation associated with causing the at least one usage limit to be exceeded; and
blocking the operation.

2. The method of claim 1, wherein identifying the operation associated with causing the at least one usage limit to be exceeded comprises:
identifying a most recent operation that increased the usage of the at least one resource; and
identifying the most recent operation as the operation.

3. The method of claim 1, wherein the operation comprises a communication request.

4. The method of claim 1, wherein the usage of the one or more resources comprises a percentage or ratio of processing resources available to the gateway.

5. The method of claim 1 further comprising maintaining one or more data structures that store the one or more usage limits for the tenant with one or more additional usage limits associated with a second tenant of the plurality of tenants.

6. The method of claim 1, wherein identifying the operation associated with causing the at least one usage limit to be exceeded comprises:
identifying operations associated with contributing to the usage of the resource;
identifying qualities of service associated with the operations; and
selecting the operation from the operations based on qualities of service.

7. The method of claim 1 further comprising:
identifying trends in the usage of the one or more resources; and
updating the one or more usage limits based on the trends.

8. The method of claim 1 further comprising:
identifying trends in the usage of the one or more resources;
determining suggested updates to the one or more usage limits based on the trends; and
generating a notification that indicates the suggested updates to the one or more usage limits.

9. The method of claim 1, wherein the one or more usage limits correspond to a quality of service associated with the tenant, and wherein at least one other tenant of the plurality of tenants is associated with a second quality of service that corresponds to one or more different usage limits.

10. The method of claim 1, wherein the tenant comprises a plurality of computing nodes.

11. An apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
monitor usage of one or more resources of a gateway by a tenant of a plurality of tenants associated with the gateway, wherein the one or more resources comprise firewall sessions, network address translation entries, routing table entries, or internet protocol security (IPsec) sessions;
compare the usage of the one or more resources with one or more usage limits associated with the one or more resources for the tenant;
determine when the usage of a resource in the one or more resources exceeds at least one usage limit of the one or more usage limits; and
when the usage of the resource exceeds the at least one usage limit:
identify an operation associated with causing the at least one usage limit to be exceeded; and
block the operation.

12. The apparatus of claim 11, wherein identifying the operation associated with causing the at least one usage limit to be exceeded comprises:
identifying a most recent operation that increased the usage of the at least one resource; and
identifying the most recent operation as the operation.

13. The apparatus of claim 11, wherein the operation comprises a communication request.

14. The apparatus of claim 11, wherein the program instructions further direct the processing system to maintain one or more data structures that store the one or more usage limits for the tenant with one or more additional usage limits associated with a second tenant of the plurality of tenants.

15. The apparatus of claim 11, wherein the one or more usage limits correspond to a quality of service associated with the tenant, and wherein at least one other tenant of the plurality of tenants is associated with a second quality of service that corresponds to one or more different usage limits.

16. The apparatus of claim 11, wherein the program instructions further direct the processing system to:
identify trends in the usage of the one or more resources; and
update the one or more usage limits based on the trends.

17. The apparatus of claim 11, wherein the program instructions further direct the processing system to:
identify trends in the usage of the one or more resources;
determine suggested updates to the one or more usage limits based on the trends; and
generate a notification that indicates the suggested updates to the one or more usage limits.

18. The apparatus of claim 11, wherein the tenant comprises a plurality of computing nodes.

19. An apparatus comprising:
one or more non-transitory computer readable storage media; and
program instructions stored on the one or more non-transitory computer readable storage media that, when executed by a processing system, direct the processing system to:
monitor usage of one or more resources of a gateway by a plurality of tenants associated with the gateway, wherein the one or more resources comprise firewall sessions, network address translation entries, routing table entries, or internet protocol security (IPsec) sessions;
compare the usage of the one or more resources by a tenant of the plurality of tenants with one or more usage limits associated with the one or more resources for the tenant;
determine when the usage of a resource in the one or more resources exceeds at least one usage limit of the one or more usage limits; and
when the usage of the resource exceeds the at least one usage limit:
identify an operation associated with the resource to be blocked based on a quality of service associated with each tenant in the plurality of tenants; and
block the operation.

20. The apparatus of claim 19, wherein the tenant comprises a plurality of computing nodes.

* * * * *